(12) United States Patent
Lucas, Jr. et al.

(10) Patent No.: US 6,399,740 B1
(45) Date of Patent: Jun. 4, 2002

(54) PROCESS FOR REDUCING MONO-FUNCTIONAL AND NON-FUNCTIONAL BY-PRODUCTS DURING ARALKYLATION OF PHENOLICS

(75) Inventors: Edward Lucas, Jr., Peachtree City, GA (US); David A. Hutchings, Dublin, OH (US); Rajan Hariharan, Duluth, GA (US); Syed A. Elahi, Woodstock, GA (US); David J. Bir, Conyers, GA (US)

(73) Assignee: Georgia-Pacific Resins, Inc., Atlantic, GA (US)

( * ) Notice: Subject to any disclaimer, the term of this patent is extended or adjusted under 35 U.S.C. 154(b) by 0 days.

(21) Appl. No.: 09/347,265

(22) Filed: Jul. 6, 1999

(51) Int. Cl.[7] .......................... C08G 63/78; C08G 63/87
(52) U.S. Cl. .......................... 528/265; 528/97; 528/101; 568/717; 568/731; 568/734; 568/744
(58) Field of Search .......................... 528/205, 97, 101; 568/717, 731, 734, 744

(56) References Cited

U.S. PATENT DOCUMENTS

| | | |
|---|---|---|
| 2,224,837 A | 12/1940 | Rosenthal et al. |
| 2,665,312 A | 1/1954 | Ohimann et al. |
| 2,687,383 A | 8/1954 | D'Alelio |
| 2,978,515 A | 4/1961 | Conklin et al. |
| 3,004,953 A | 10/1961 | Sonnabend |
| 3,177,166 A | 4/1965 | Gregory et al. |
| 3,328,489 A | 6/1967 | Murdock |
| 3,420,915 A | 1/1969 | Braithwaite |
| 3,546,173 A | 12/1970 | Hunt |
| 3,808,279 A | 4/1974 | Buysch et al. |
| 3,936,510 A | 2/1976 | Harris et al. |
| 3,979,462 A | 9/1976 | Krimm et al. |
| 3,996,160 A | 12/1976 | Dale et al. |
| 3,996,198 A | 12/1976 | Wang et al. |
| 3,996,199 A | 12/1976 | Weinshenker et al. |
| 4,085,085 A | 4/1978 | Tsuchiya et al. |
| 4,110,540 A | 8/1978 | Freitag et al. |
| 4,127,564 A | 11/1978 | Sanborn |
| 4,210,733 A | 7/1980 | Hayashi et al. |
| 4,307,012 A | 12/1981 | Serres, Jr. |
| 4,310,657 A | 1/1982 | Serres, Jr. |
| 4,380,554 A | 4/1983 | Serres, Jr. |
| 4,403,088 A | 9/1983 | Smith et al. |
| 4,432,921 A | 2/1984 | Haars et al. |
| 4,639,503 A | 1/1987 | Hara et al. |
| 4,666,974 A | 5/1987 | Keskey et al. |
| 4,690,995 A | 9/1987 | Keskey et al. |
| 4,824,929 A | 4/1989 | Arimatsu et al. |
| 4,897,438 A | 1/1990 | Kikuchi et al. |
| 4,900,671 A | 2/1990 | Pokora et al. |
| 4,927,905 A | 5/1990 | Bogan |
| 4,968,759 A | 11/1990 | Kikuchi et al. |
| 5,043,483 A | 8/1991 | Sogli et al. |
| 5,102,962 A | 4/1992 | Kikuchi et al. |
| 5,270,403 A | 12/1993 | Mori |
| 5,674,970 A | 10/1997 | Hutchings et al. |
| 5,739,259 A | 4/1998 | Hutchings et al. |
| 5,756,655 A | 5/1998 | Lucas, Jr. et al. |
| 5,770,750 A | 6/1998 | Hutchings et al. |
| 5,837,798 A | 11/1998 | Hutchings et al. |

FOREIGN PATENT DOCUMENTS

| | | |
|---|---|---|
| DE | 28 16 112 | 4/1978 |
| DE | 3541210 A1 | 5/1986 |
| EP | 506080 A2 | 9/1992 |
| FR | 2 337 185 | 7/1977 |
| JP | 8-73570 | 3/1996 |

OTHER PUBLICATIONS

P.L. Dubin et al., "Observed Bimodality in a Branched Condensation Polymerization", pp. 117–120.
P.L. Dubin et al., "Bimodal Molecular Weight Distributions of a Branched Condensation Polymer," J. Polymer Science, vol. 20, pp. 1709–1716 (1982).

*Primary Examiner*—Duc Truong
(74) *Attorney, Agent, or Firm*—Banner & Witcoff, Ltd.

(57) ABSTRACT

Phenol aralkyistion polymers can be prepared by reaction among a phenolic monomer, at least one styrenic monomer and an aryl diolefin. A phenolic monomer can be initially aralkylated in the presence of an acid catalyst with a first portion of at least one styrenic monomer to obtain an aralkylated phenol. The aralkylated phenol thereafter can be reacted with an aryl diolefin to obtain a phenol aralkylation polymer. Optionally, (though preferably) the phenol aralkylation polymer is further aralkylated with a second portion of at least one styrenic monomer. By employing specific catalyst concentrations, reactant concentrations, reaction temperatures, and reaction times, the formation of monofunctional and non-functional by-products is substantially reduced.

26 Claims, No Drawings

PROCESS FOR REDUCING MONO-FUNCTIONAL AND NON-FUNCTIONAL BY-PRODUCTS DURING ARALKYLATION OF PHENOLICS

FIELD OF THE INVENTION

The present invention is directed to the formation of phenol aralkylation polymers and, more particulrly, to methods of preparing phenol aralkylation polymers with minimized formation of mono-functional and non-functional by-products.

DESCRIPTION OF RELATED ART

Recently, a new class of phenolic-type polymers have been developed by co-reaction among a phenolic monomer, at least one styrene derivative, and a divinyl aromatic monomer or aryl diolefin. In a first embodiment, these polymers can be prepared by initially aralkylating a phenolic monomer with the at least one styrene derivative to obtain aralkylated phenol, and thereafter reacting the aralkylated phenol with the aryl diolefin to obtain a phenol aralkylation polymer, having aralkylated phenols joined together with the aryl diolefin, generally with the primary linkage at the ortho position. The styrene monomer is added to a reaction medium containing the phenolic monomer and an acid catalyst, possibly in the presence of an inert solvent such as o-xylene. Phenol aralkylation polymers also can be prepared, in a second embodiment, by reacting phenolic monomer initially with aryl diolefin in the presence of acid catalyst to obtain a phenolvaryl diolelin polymer and then aralkylating the phenol/aryl diolefin polymer with at least one styrene derivative to obtain a phenol aralkylation polymer, generally with a portion of the phenolic linkages being para in orientation. In the case of polymers made using bisphenol-A as the phenolic monomer, the bisphenol-A generally is melted in the presence of an inert solvent before adding the diolefin monomer and catalyst.

Drawbacks associated with presently available methods for producing phenol aralkylation polymers are the level of formation of mono-functional degradation by-products of the phenolic monomer, particularly bisphenol A, by so-called "retro reactions," as well as the level of non-functional by-products formed by homopolymerization of the styrene derivatives and/or the aryl diolefins. Formation of such by-products degrades functionality and reduces the yield of the desired phenol aralkylation polymer. It would be desirable to develop a process which avoids or substantially reduces homopolymerization and degradation by-product formation and improves functionality and yield of the desired phenol aralkylation polymer.

SUMMARY OF THE INVENTION

The present invention is directed to an improved method of preparing poly-functional phenol aralkylation polymers exhibiting improved oil solubility, and improved compatibility with oil and alkyd-based polymers, as well as with urethanes, epoxies and actylates. The present invention is particularly directed to a method for preparing phenol aralkylation polymers with minimized homopolymerization, e.g., formation of non-functional by-products, and with minimized formation of mono-functional degradation by-products.

Present methods of preparing aralkylation polymers produce considerable amounts of mono-fuctional and non-functional adducts of the phenol reactant, especially bisphenol A, as well as allowing homopolymerization of styrenic monomers and/or aryl olefins. For example, the reaction of bisphenol-A, p-t-butyl styrene, styrene, and divinyl benzene in the presence of 70 wt % methane sulfonic acid (0.0022 moles MSA per mole of bisphenol-A) produces a strong exothermic reaction in which inter alia phenol, isopropenyl phenol, (p-t-butyl styrene) phenol, (p-t-butyl styrene) isopropenyl phenol, and polystyrene degradation by-products and reaction adducts are observed.

Phenol aralkylation polymers can be formed by the reaction among a phenolic monomer, a styrenic monomer and an aryl diolefin in the presence of a catalyst. Preferably, the phenolic monomer iially is arlkyi with a first portion of at least one styrenic monomer to obtain an aralkylated phenol, and the aralkylated phenol then is reacted with an aryl diolefin to obtain a phenol aralkylation polymer. Optionally, (though preferably) the phenol aralkylation polymer is further aralkylated with a second portion of at least one styrenic monomer. The preliminar aralkylation reaction between the phenolic monomer and the first portion of the styrenic monomer is believed to direct the subsequent reaction of the partially aralkylated phenolic monomer with the aryl diolefin to the formation of coupled aralkylation products through a combination of resonance, inductive and steric effects.

Preferably, the initial aralkylation reaction of the present invention is initiated by forming a reaction medium or mixture of the styrenic monomer and the phenolic monomer; heating the mixture to a first temperature; and then slowly adding an acid catalyst to allow the reaction mixture to exotherm to a second elevated temperature. It has been discovered that by employing a specific catalyst concentration, reactant concentrations, reaction temperature, and reaction time, the formation of mono-functional and non-functional degradation by-products, as well as the undesired homopolymerization of monomers, can be substantially reduced. According to a preferred embodiment of the invention, bisphenol-A is employed as a phenolic monomer. When using bisphenol-A, about 2 moles of styrenic monomer are added per mole of bisphenol A. A preferred catalyst is methane sulfonic acid (MSA). Methane sulfonic acid is preferably added to the reaction mixture at a molar ratio of moles of catalyst to moles of bisphenol A of about 0.0005:1. The reaction temperature preferably does not exceed about 140° C. at any time during the reaction. Under these controlled reaction conditions, phenol aralkylation polymers can be produced with no more than 10 wt % (100,000 ppm) of either or both phenol degradation by-products and poly aryl-olefin homopolymers.

Aralkylated polymers made by the invention, particularly in large commercial scale batches, are expected to have a low polydispersity and a well-defined (i.e., controlled) functionality making them useful for reaction into other polymer systems to increase the strength/modulus of the resulting polymeric adducts. The method of the present invention is especially applicable to those phenolic monomers of a relatively high melting point such as bisphenol-A and bisphenol-F.

It is to be understood that both the foregoing general description and the following detailed description are exemplary and explanatory only and are not restrictive of the present invention as claimed.

DETAILED DESCRIPTION OF THE INVENTION

The present invention is directed to a method for preparing phenol aralkylation polymers which exhibit good oil solubility and show a decreased tendency to darken over time. The phenol aralkylation polymers of the present invention have substantially reduced phenol and formaldehyde emissions, and have excellent adhesion and corrosion properties. Also, the products of the invention have high solubility in non-aromatic (Hazardous Air Pollutants ("HAP's") free) solvents. The phenolic aralkylation polymers made by the method of the invention are also useful for incorporation with many other polymers which include, but are not limited to, alkyds, urethane, epoxy, and acrylate polymer systems. The increase in aromatic character obtained by the practice of the present invention result in an enhancement in the compatibility of the phenolic aralkylation polymer with the aforementioned polymer types, and also generally lead to an enhancement of physical properties, adhesion, and barrier property performance.

The term "polymer" used throughout the specification and claims is intended to embrace adducts having a wide range of molecular weights (including products often referred to as oligomers) made by reacting the various monomers used in practicing the present invention.

The phrase "commercial-sized quantities" and phrases of similar import are intended to embrace those conditions of scale where one generally encounters signifcent non-uniformities in the processes of heat and mass transfer. For instance, when preparing batches of phenol aralkylation polymer of one thousand pounds or greater, and especially batches often thousand pounds or greater, melting of the solid phenolic monomer on that scale presents a significant heat transfer problem to obtain rapid melting of the phenolic monomer without an undesired amount of monomer degradation.

It will be recognized by those skilled in the art that the molecular structures illustrated in the following specification represent idealized average structures. The actual polymer products constitutes a complex mixture of molecules typically containing a range of polymer products analogous to the idealized structure.

The phenol aralkylation polymers produced by the method of the present invention can be derived from a phenolic monomer, preferably bisphenol-A, or bisphenol-F, at least one styrenic monomer, and an aryl diolefin or divinyl aromatic monomer. In addition to the phenolic monomer, styrenic monomer and aryl diolefin, other reactants may be introduced to produce a product with particular properties. Such polymers and methods for their preparation are described in U.S. Pat. Nos. 5,674,970, 5,756,655, and 5,837,798, the disclosures of which are incorporated by reference herein.

In carrying out the method of this invention, a solution or dispersion of the phenolic monomer in the styrenic monomer can be made at an appropriate temperature, typically in the range of 100 to 120° C. An acid aralkylation catalyst, in particular a Bronsted acid, then is added to the solution/dispersion to initiate the aralkylation reaction. The reaction is strongly exothermic, and the heat that is generated facilitates self-heating of the reaction mixture to a temperature that ensures homogeneity for the subsequent reaction of the aralkylated phenol with aryl diolefin. In accordance with the present invention the heat of the exothermic reaction is controlled by cooling to prevent the reaction temperature from exceeding about 140° C. Alternatively, a solution or dispersion of the phenolic monomer in the aryl diolefin can be prepared initially, and the acid catalyst can be added to the solution/dispersion to produce a phenol/aryl diolefin polymer. This reaction also is exothermic, and heat that is generated ensures homogeneity for the subsequent reaction of the phenol/aryl diolefin polymer with styrenic monomer.

Two important aspects of the method of the present invention are (1) controlling the amount of catalyst added to the reaction mass and (2) controlling the maximum temperature to which the reaction mass is heated. The amount of acid catalyst required generally depends on the effective acidity and type of catalyst selected, but typically will be less than about 0.1mole percent, more typically from about 0.04 to 0.06 mole percent, based on the total number of moles of acid and phenolic monomer.

Preferably, the exotherm reaction that occurs with the reaction mass is controlled via cooling so that the reaction mass experiences only a 25° to 40° C. temperature increase (exotherm) during the initial aralkylation. Once the reaction mass reaches a temperature of about 1250 to 140° C., the reaction mass generally becomes homogeneous. The reaction is allowed to proceed at that temperature for a time sufficient to consume at least about 95% of the styrenic monomer, which often takes about 60 to 150 minutes at the preferred temperature. The invention has particular advantage when using a high melting point (and possibly temperature-sensitive) phenolic monomer such as resorcinol, catechol, bisphenol-A, bisphenol-F and hydroquinone. These phenolic monomers melt at a temperature in excess of about 90° C., and prolong exposure at elevated temperatures often contributes to their degradation.

Another important aspect of the present invention is controlling the molar ratio of sytrenic reactants to phenolic monomer in the reaction mass. (Pre)reaction of a first portion of at least one styrenic monomer with phenolic monomer partially blocks and activates the reaction sites of the phenolic monomer before the addition of the aryl diolefin which subsequently linns or couples the partially aralkylated species together. The low polydispersities expected in the ultimate products of the invention are believed to be due to this controlled (pre)reaction. As a result, the amount of the first portion of the at least one styrenic reactant should be sufficient to obtain the inductive and resonance effects in the subsequent coupling reaction, while minimizing formation of degradation by-products and homopolymerization. In this regard, the total styrenic reactant conception preferably is from 0.5 to 2.5 moles per mole of phenolic monomer, typically from about 0.8 to about 2.2 moles per mole of phenolic monomer, and more typically from about 1.2 to about 2.1 moles per mole of phenolic monomer. In this way, sufficient activation of the phenolic monomer for the subsequent coupling reaction is obtained without over-aralkylation of the phenolic monomer such as to interfere with the subsequent coupling reaction. These amounts of styrenic reactant also generally ensure a sufficient amount of fluidity to the reaction mixure to reaize the advantages on enhancement of heat and mass transfer processes of the present invention. In cases where the aryl diolefin is intended to be added at levels near and above a mole ratio of one mole of aryl diolefin to one mole phenolic monomer, the initial aralkylation reaction provided by the present invention also prevents gelation of the polymer during synthesis.

Following the (pre)reaction of the phenolic monomer with the first portion of at least one styrene reactant, the aryl diolefin is added to the reaction mixture at the then-prevailing tempeure, generally from about 125° to 145° C., and preferably from about 130° C. to 140° C. This moderate temperature promotes the desired coupling reaction that contributes to the formation of an aralkylated polymer of a higher molecular weight and an expected lower polydispersity, while concurrently minimizing formation of mono-functional and non-functional adducts.

Reactants

The styrenic monomers used in the process of the present invention may be any of the aryl substituted alke hydrocarbons. Examples include styrene, α-methyl styrene, p-methyl styrene, p-t-butyl styrene, α-methyl-p-methyl styrene, β-methyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, isopropenyl naphthalene, 2-methyl-1,1-diphenyl propene, 1-phenyl-1-pentene, and the like. Mixed styrenic monomers means a mixture of, for example, p-and m-t-butyl styrenes. The preferred styrenic monomers are styrene and homologs of styrene of the formula:

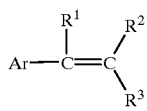

Where Ar may be phenyl, naphthyl, biphenyl, or substituted phenyl, naphthyl, or biphenyl. Substituted phenyls are illustrated by the following:

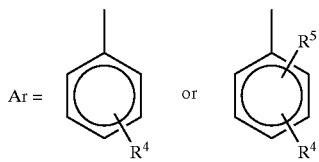

Where $R^4$ and $R^5$ are independently methyl, ethyl, $C_3$ to $C_{10}$ alkyl or a halogen. $R^1$, $R^2$ and $R^3$ are independently hydrogen, an alkyl radical containing 1 to 5 carbon atoms, an aromatic or an alkyl aromatic. $R^1$, $R^2$ and $R^3$ also can be other functionalities such as a carboxyl as in the case of cinnamic acid.

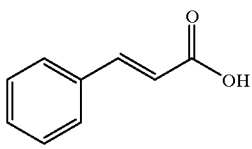

Such systems are particularly valuable as a means of introducing carboxyl fuinctionality on a phenolic monomer:

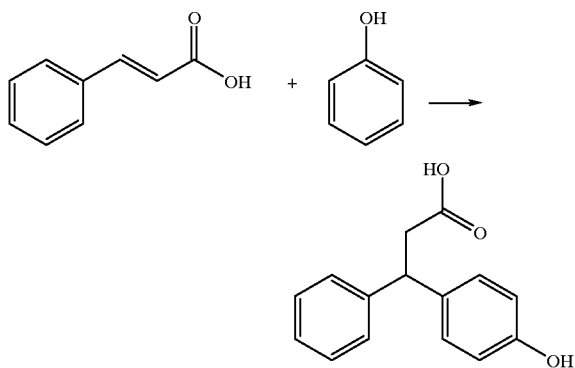

Esters of systec monomers may also be used. $R^1$, $R^2$ and $R^3$ can be carboxyl (—$CO_2H$) or alkoxy (—O—R) groups.

Preferably, the styrenic monomer is styrene, α-methyl styrene, p-t-butyl styrene, r-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, or mixtures thereof.

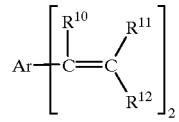

The divinyl aromatic monomer or aryl diolefin can be represented by the following formula.

Wherein Ar is benzene, naphthalene, or biphenyl; $R_{10}$, $R_{11}$ and $R_{12}$ independently are a hydrogen or an alkyl radical containing 1–5 carbon atoms. The orientation on the benzene ring is meta or para or mixtures thereof.

Possible substitutions for naphthalene include 1–3, 1–4, 1–5, 1–6, 1–7, 1–8, 2–4, 2–5, 2–6, 2–7 or 2–8 and corresponding mixtures thereof.

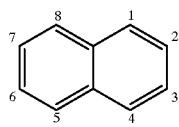

Possible substitutions for biphenyl include 1–3, 1–2', 1–1', 1–3', 2–3', and 3–3', and corresponding mixtures thereof.

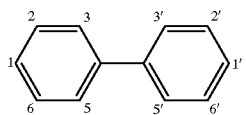

The aromatic nucleus may be substituted with various R groups, for example, methyl and t-butyl.

Preferably the aryl diolefin is m- or p-diisopropenyl benzene (DIPB) or their m, p mixtures or mixed m/p divinylbenzene (DVB) of any of the commercially available concentrations. m-DIPB is commercially available at a 98% concentration. DVB is available at concentrations of, for example, 53%, 62%, and 80%. DVB concentrations also contain ethyl-styrene (vinyl ethyl benzene). For instance, 80% DVB contains approximately 20% ethyl styrene. Diols derived from DIPB such as m or p diols of dilsopropyl benzene are acceptable diolefin materials.

Diols derived from DIPB such as m or p diols of diisopropenyl benzene are acceptable precursor materials for amyl diolefins since they can be considered blocked aryl diolefins, i.e., they react as a blocked diolefin.

The term "total styrenic reactant" is used herein to denote the total amount, i.e. sum of strenic monomers, divinyl aromatic monomers, aryl olefins, and aryl diolefins which are present or added to a reaction mixture.

Phenol Monomers

Phenolic monomers for practicing the present invention constitute phenols which contain at least two free reactive positions. For example, in the case of phenol and substituted phenols, monomers contain at least two free reactive (ortho- or para-positions). Examples include phenol itself, o-,p- and m-cresol, m-isopropyl phenol, 3,5-xylenol, 3,5-diisopropyl phenol and mixtures of these compounds. Specific classes include:

I. Phenolic Monomers Containing Mononuclear Phenolic Substituents are Shown by the Formula:

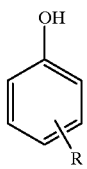

Substitution may be ortho, meta, or para. R may be methyl, ethyl, isopropyl, n-propyl, t-butyl, isobutyl, n-butyl, $C_{5-10}$ aliphatic substituents, phenyl, or a substituent derived from arallylation with styrenic monomers, e.g styrene, p-methyl styrene, t-butyl styrene, mixed t-butyl styrenes, α-methyl styrene, and vinyl toluenes.

II. Polyhydroxy Mononuclear and Polynuclear Phenolic Monomers Include:

(1) Hydroquinone, resorcinol, and catechol;

(2) Alkyl or aralkyl, mono and disubstituted, hydroquinones

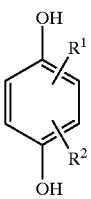

wherein the substitutions of $R^1$ and $R^2$ on the ring include 2,3; 2,5; and 2,6, and $R^1$ and $R^2$, independently, can be hydrogen, alkyl having 1–10 carbon atoms, and aralkyl derived from styrenes as benzylic derivatives, as previously described. $R^1$ and $R^2$ can also be divinyl aromatics, which can give rise to chain extended systems, as taught herein, for monohydroxy phenolic monomers. The latter system advantageously requires minimal incorporation of the dihydroxy monomer into the polymeric product to achieve the desired high hydroxy functionality.

(3) Alkyl or aralkyl, monosubstituted resorcinol:

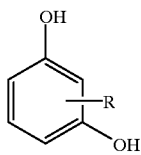

wherein R is in the 2,4, or 5position on the ring. R can be hydrogen, an alkyl having11–10 carbon atoms or an arly derived from styrenes or benzylic derivatives, as previously described. R can be divinyl aromatic, which can give rise to chain extended sytm,as taught for the monohydroxy phenolic monomers. Advantages of the latter systems include minimal incorporations of the subject monomer into an alkylation polymer to achieve the desired high hydroxy functionality.

Resorcinol can also be used in the disubstituted (alkyl or aralkyl) mode to produce lower funictionality polymers and in combination with difuinctionally reactive monomers such as hydroquinone or monosubstituted phenolics, as described herein.

(4) Alkyl or aralkyl, substituted catechol

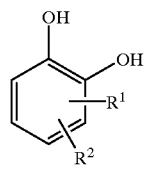

wherein the substitutions of $R^1$ and $R^2$ on the ring include 3,4 or 3,5 and wherein $R^1$ and $R^2$ independently, can be hydrogen, an alkyl having 1–10 carbon atoms, or an aralkyl derived from styrenes, or benzylic derivatives, as previously described. $R^1$ and $R^2$ can also be divinyl aromatics, which can give rise to chain-extended systems, as taught for the monohydroxy phenolics. The latter system also advantageously requires minimal incorporation of the dihydroxy monomer into the polymeric product to achieve the desired high hydroxy functionality.

(5) Alkyl or aralkyl, substituted polyhydroxy-polycyclic aromatic phenols. Examples include:
  (a) Dihydroxynaphthalenes: 1,2; 1,3; 1,4; 1,5; 1,6; 1,7; 1,8; 2,3; 2,4; 2,5; 2,6; 2,7; 2,8.
  (b) Dihydroxy derivatives of anthracene, phenanthracene, etc.

III. Polynuclear phenolic monomers include:
(1) Bisphenol A;
(2) Bisphenol F;
(3) Dihydroxy biphenyl-bisphenols derived by various means
  a) p,p'dihydroxybisphenyl.
  b) disubstituted bisphenols derived from coupling of monosubstituted alkyl phenolics by action of the enzymatic coupling of phenols (Mead Process). The Mead Process is described in, for example, U.S. Pat. No. 4,900,671 which is hereby incorporated by reference.
(4) Bisphenols or polymeric phenols coupled by aldehydes or ketones.

These phenolic monomers are employed as an initial phenolic monomer in the reaction and may also be employed as an additional phenolic monomer later in the reaction. Phenolic monomers that are especially benefited by the present invention are bisphenol A and similar bis-phenol adducts where the alkylene link between the phenolic moieties is branched, such as can be obtained by reacting phenol with dialdehydes. Other preferred phenolic monomers include hydroquinone, resorcinol, p-t-butyl phenol, p-cumyl phenol, and p-octyl phenol. Polymers produced from the above monomers may also be used as the phenolic monomer. The present invention is especially useful for those phenolic monomers having a high melting point which may be susceptible to thermal degradation.

The amount of aryl diolefin used depends on such factors as the phenolic monomer used and the amount of chain extension desired in the end product. Higher amounts may be used under circumstances in which alkyl- or aralkyl substituted phenolics are used and in which a higher molecular weight product is desired. Lower amounts may be employed under circumstances where a low level of chain extension is desired, The amount of aryl diolefin required also depends on the amount of phenolic hydroxy substitution on the phenolic monomer used. In the case of bisphenol A (which is a di-functional phenolic monomer having four activated ring sites for ready alkylation reaction), less aryl diolefin may be required to give a desired degree of phenolic flictionality, because the phenolic monomer is higher in both molecular weight and functionality to start. Similarly, a formaldehyde-linked phenolic polymer can be further coupled with aryl diolefins to build molecular weight to desired levels.

The ultimate degree of styrenation employed with this polymer class can also vary. For the purposes of this invention, the degree of styrenation is defined as the ratio between the total moles of styrenic monomers used and the molar equivalent of open reactive positions per phenolic monomeric component. As noted above, in addition to the first portion of the styrenic monomer, it is optional and often preferred to include a second portion of styrenic monomer added after the diolefin coupling reaction. The degree of styrenation contributed by both the first and second portions of styrenic monomers is determined by subtracting the theoretical number of reactive positions used to couple with the aryl diolefin or other linking group from the total number of reactive positions per monomers. For example, phenol is considered to have 3 reactive positions. If two phenol molecules are coupled with an aryl diolefin, two open positions remain per phenol ring. The theoretical mole ratio for styrenation (moles of styrene per phenol molecule) is therefore 2. For the present invention, the effective range for styrenation may be from 20 to 100 percent of the theoretical mole ratio, with a more effective amount being above 60% of theoretical.

In accordance with the present invention, a reaction between the phenolic monomer and at least one styrenic monomer is initiated in the presence of a Bronsted acid catalyst. Since the system is generally low in water content, the effective acidity of the catalyst system is increased.

Acid catalysts which may be used include, but are not limited to:

Alkylsulfonic acids—methane, ethane, and higher alkyl $C_3$–$C_{10}$;

Arylsulfonic acids, toluene, xylene, and mixtures thereof; also, naphthalene sulfonic and aralkylated toluene, benzene, or naphthalene sulfonic acids containing $C_1$–$C_{10}$ alkyl substituents;

Phenol sulfonic and sulfonated phenolic polymers which may include aralkylated phenolics;

Sulfuric acid;

Phosphoric acid;

Alkyl, aryl or aralkyl phosphate esters having at least one free acidic proton per molecule;

Hydrochloric acid;

Latent acid catalyst systems including organic acid chlorides, phosphorous oxychlorides, and the like;

Latent acid catalysts derived from amines and the above;

Oxalic acid, maleic acid and other strong organic diacids having initial pKa's<1.5; and Halogenated organic acids such as chloroacetic and trifluoroacetic acid.

The amount of acid catalyst required depends on the effective acidity and the specific catalyst selected. Strong acids such as sulfonic and methane sulfonic require quantities less than about 0.1 mole percent typically from about 0.02 to about 0.08 mole percent, more typically from about 0.04 to 0.06 mole percent, based on the total number of moles of acid and phenolic monomer, provided that the reactants do not contain basic impurities. It will be noted that dilute solutions of the acids can be used providing that provisions are made to remove water from the reaction mixture.

Methane sulfonic acid is a preferred acid. Applicants also contemplate the optional use of a Lewis acid type co-catalyst, such as a metal alkoxide and specifically an aluminum alkoxide, with the required Bronsted type acid as described above. In some instances, the use of such a combination catalyst system within the limits of the present invention can provide improved results.

As noted above, the temperature of the aralkylation and aryl diolefin coupling reactions depends on a number of factors and is generally between about 125–145° C., most often between about 135–140° C. The particular temperature selected depends on the nature of the aralkylating agent and may require some optimization for each system. It is preferred that the reaction temperature does not exceed about 140° C. in order to minimize homopolymerization and formation of degradation by-products. The reactant concentrations, catalyst concentrations, and reaction temperatures given above can be applied to all combinations of phenol, substituted phenols, and phenol aralkylation products with either styrene, its derivatives, or aryl diolefins. The aralkylation reaction can be stopped completely by neutralization of the acid catalyst, and systems so-stabilized can be heated to temperatures in the 200–250° C. range for substantial periods without de-aralkylations or other similar decompositions.

The phenolic monomer is selected to provide an aralkylated phenol and in the method of this invention is preferably bisphenol A. Additional phenolic monomers may be added prior to reacting the arallat phenol with the aryl diolefin such as p-t-butyl phenol, pcumyl phenol and p-octyl phenol. It is within the skill of the art to determine what phenolic monomers are appropriate to react with the styrenic monomer to obtain an aralkylated phenol and what phenolic monomers may be added later to build the various polymer structures.

The aralkylated phenol product then can be reacted with an aryl diolefin to obtain a phenol aralkylation polymer, with the aralkylated phenol joined to the aryl diolefin primarily at the o-position. If needed, the pH of the reaction mixture may be lowered by means of acid catalyst addition. The same catalysts can be considered for diolefin reaction with the styrenated phenols as were used to promote the reaction of phenol or its derivatives with aryl olefins. Indeed, in practice of this invention, the same catalyst system is normally used to conduct the divinyl aromatic monomer-phenol polymerization reaction as was used for the precursor phenolic reactant styrenation, often without any need for further catalyst addition.

After conducting the aralkylation reactions, the final product can be neutralized with caustic, potassium hydroxide, or generally any alkaline material.

The acid catalyst may be any effective acid catalyst and preferably is methane sulfonic acid. However, the catalyst systems described earlier may be employed with advantage depending on the results desired. It will be noted that under conditions when neutralization of the catalyst with its removal by filtration is performed, that mineral acids may represent the most desired catalyst. For example, sulfuric or phosphoric acid are readily removed as their sodium or potassium neutralization salts. In contrast, under conditions where organic neutralization salts may be of an advantage by allowing their retention in the final product as a dissolved phase, the use of organic hydrophobic catalysts such as the alkyl naphthalene sulfbonic acids and their amine neutralization products may be of an advantage. Amines can be selected from the group including primary, secondary and tertiary aliphatic ($C_1$–$C_{10}$) and aralkyl amines in which the amine substituents can be aromatic or benzylic in combination with aliphatic components ($C_1$ to $C_{10}$). A good neutralizing amine for purposes of these products would be diethyltertiary butyl amine.

EXAMPLES

To facilitate a more complete understanding of the invention, a number of Examples are provided below. The scope of the invention, however, is not limited to specific embodiments disclosed in these Examples, which are for purposes of illustration only.

In Examples 1 and 4, the divinyl benzene monomer used was 63 wt % divinyl benzene with the balanc ethyl vinyl benzene. Ethyl vinyl benzene is a component of the total styrenic reactant. The total styrenic reactant:phenolic monomer mole ratio for these Examples thus is calculated as moles of divinyl benzene + moles of ethyl vinyl benzene + moles of p-t-butyl styrene/moles of bisphenol-A.

Example 1

A phenol aralkylation polymer was prepared at a total styrenic reactant:phenolic monomer mole ratio of about 1.5:1 as follows.

A stainless steel pilot plant reactor was purged with nitrogen after thoroughly cleaning with alternate solvent and caustic washes. A phenolic monomer (2274.7 g of bisphenol-A) was added to the rector under a nitrogen atmosphere and heated to a temperature of 150° C. A dilute acid aralylation catalyst was prepared by dissolving methane sulfonic acid in n-butanol to obtain an MSA concentration of approximately 30 wt. %. Then, a premix of aryl diolefin and acid catalyst was made by mixing 1027 g of divinylbenzene and 1.8 g of the dilute methane sulfonic acid catalyst solution. The aryl diolefin/acid mixture then was slowly added to the melted phenolic monomer. The resultant exotherm was maintained at a temperature of 150° C. Generally, the exotherm will occur within 10 minutes of catalyst addition. A 2-hour reaction period was provided after addition of the aryl diolefin/acid mixture with the temperature being maintained at about 150° C. throughout.

Next, a styrenic monomer (para-tert-butylstyrene (1196.5 g)) was charged to the reactor over a period of 60 minutes. An exotherm also was observed during the initial stage of this charge, but the temperature was not allowed to exceed 150° C. After the 60-minute para-tert-butylstyrene addition period, the temperature was held for an additional 3 hours at 150° C. At the end of this period, 1 g of 500% potassium hydroxide was added to neutralize the acid catalyst.

The product thereafter was analyzed for the presence of non-functional and mono-functional by-products, and was found to contain 6,900 ppm non-functional by-products and 65,500 ppm mono-functional by-products.

Example 2

A phenol aralkylation polymer was prepared at a total styrenic reactant:phenolic monomer mole ratio of about 2:1 as follows.

Bisphenol-A was used as the phenolic monomer and divinyl benzene was used as the aryl diolefin. The styrene monomer used was para-tert-butylstyrene. Methane sulfonic acid was used as the aralkylation catalyst.

207.95 g of bisphenol-A and 145.95 of para-tert-butylstyrene were added to the rector under a nitrogen atmosphere and heated to a temperature of 120° C. Next, 0.15 g of a dilute methane sulfonic acid solution (as prepared in Example 1) was added. The reaction mixture was allowed to exotherm to 130–140° C. and held for 1 hour. An additional 145.95 g of para-tert-butylstyrene were added over a 60 minute period and then held at least an additional 2 hours at 130–140° C.

The product thereafter was analyzed for the presence of non-functional and mono-functional by-products, and was found to contain 11,400 ppm non-functional by-products and 30,400 ppm mono-functional by-products.

Example 3

In this example, a phenol aralkylation polymer was prepared by adding all of the para-tert-butylstyrene initially and in a total styrenic reactant: phenolic monomer mole ratio of about 2:1 as follows.

Bisphenol-A was used as the phenolic monomer and para-tert-butylstyrene was used as the styrene monomer. Methane sulfonic acid was used as the aralkylation catalyst. The styrene monomer was added in an amount of about 2 moles per mole of bisphenol-A.

207.95 g of bisphenol-A and 291.9 of para-tert-butylstyrene were added to the rector under a nitrogen atmosphere and heated to a temperature of 120° C. Next, 0.15g of a dilute methane sulfonic acid solution (as prepared in Example 1) was added and the reaction mixture was allowed to exotherm to 130° C., and held at 130–135° C. for 3 hours.

The product thereafter was analyzed for the presence of non-functional and mono-functional by-products, and was found to contain 23,900 ppm non-functional by-products and 16,400 ppm mono-functional by-products.

Example 4

A phenol aralkylation polymer was prepared at a total styrenic reactant:phenolic monomer mole ratio of about 1.3:1 as follows.

252.8 g of bisphenol-A and 114.2 g of divinylbenzene were added to the rector (without nitrogen) and heated to a temperature of 117° C. Next, 0.2 g of a dilute methane sulfonic acid solution (as prepared in Example 1) was slowly added and allowed to exotherm to 130° C. and held at that temperature for 1 hour.

Next, a styrenic monomer (para-tert-butylstyrene (88 g)) was charged to the reactor over a period of 30 minutes. The temperature of the exotherm was not allowed to exceed 130° C. After the 30-minute para-tert-butylstyrene addition period, the temperature was held for an additional 1 hour at 130° C.

The product was very thick and light in color. A sample was analyzed by GCMS, and no polystyrene was observed. The product contained 6,400 ppm non-functional by-products and 10,500 ppm mono-functional by-products.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process of producing an aralkylated phenol composition with minimized formation of (i) non-functional homopolymerized styrenic components and (ii) mono-functional phenol degradation by-products, the process comprising:

preparing a reaction mixture of at least one styrenic monomer and a phenolic monomer at a molar ratio of moles of total styrenic reactant to moles of phenolic monomer of from 0.5 to 2.1;

adding an aralkylation catalyst to the reaction mixture to initiate a reaction between the phenolic monomer and the at least one styrenic monomer, wherein said aralkylation catalyst is added in an amount less than 0.1 mole percent based on the total number of moles of catalyst and phenolic monomer; and maintaining said reaction mixture at a reaction temperature not exceeding 140° C. for a time sufficient to convert at least a portion of said phenolic monomer to said aralkylated phenol, wherein said aralkylated phenol composition so-produced comprises no more than 10% by weight combined of (i) said non-functional homo-polymerized styrenic components and (ii) said mono-functional phenol degradation by-products.

2. The process of claim 1 further comprising:

adding an aryl diolefin to the aralkylated phenol to initiate a reaction between the aralkylated phenol and the aryl diolefin and obtain a phenol aralkylation polymer and, optionally, thereafter adding a second portion of a phenolic monomer to the phenol aralkylation polymer to obtain further aralkylation of the polymer.

3. The process of claim 1 wherein the styrenic monomer is selected from the group consisting of styrene, α-methyl styrene, p-t-butyl styrene, p-ethyl styrene, m-ethyl styrene, p-vinyl toluene, mixed vinyl toluenes, mixed t-butyl styrenes, mixed ethyl styrenes, mixed t-butyl styrenes with di-t-butyl styrenes, and mixtures thereof.

4. The process of claim 3 wherein the styrenic monomer is selected from the group consisting of α-methyl styrene, p-t-butyl styrene, p-vinyl toluene, mixed vinyl toluenes and mixtures thereof.

5. The process of claim 2 wherein the aryl diolefin is selected from the group consisting of m-diisopropenylbenzene, p-diisopropenylbenzene, mixed diisopropenylbenzenes, m-divinylbenzene, p-divinylbenzene, and mixed divinylbenzenes.

6. The process of claim 1 wherein the phenolic monomer is selected from the group consisting of bisphenol A, bisphenol F, hydroquinone, resorcinol and catechol.

7. The process of claim 2 wherein all or a portion of the aryl diolefin is derived by dehydration of benzylic diols.

8. The process of claim 1 wherein said molar ratio of moles of total styrenic reactant to moles of phenolic monomer is from about 0.8 to about 2.

9. The process of claim 8 wherein said molar ratio is from about 1.2 to about 2.

10. The process of claim 1 wherein said aralkylation catalyst comprises alkyl sulfonic acid and is added in an amount from about 0.04 to 0.06 mole percent based on the total number of moles of catalyst and phenolic monomer.

11. The process of claim 1 wherein said reaction temperature is from about 130° C. to about 135° C.

12. A process of producing a phenol/aryl diolefin polymer composition with minimized formation of (i) non-functional homo-polymerized styrenic components and (ii) mono-functional phenol degradation by-products, the process comprising:

preparing a reaction mixture of at least one styrenic reactant and a phenolic monomer at a molar ratio of moles of total styrenic reactant to moles of phenolic monomer of from 0.5 to 2.1, said at least one styrenic reactant comprising an aryl diolefin;

adding a catalyst to the reaction mixture to initiate a reaction between the phenolic monomer and the aryl diolefin, wherein said catalyst is added in an amount less than 0.1 mole percent based on the total number of moles of catalyst and phenolic monomer; and maintaining said reaction mixture at a temperature not exceeding 140° C. for a time sufficient to convert at least a portion of said phenolic monomer to said phenol/aryl diolefin polymer, wherein the phenol/aryl diolefin polymer composition so-produced comprises no more than 10% by weight combined of (i) said non-functional homo-polymerized styrenic components and (ii) said mono-functional phenol degradation by-products.

13. The process of claim 12 further comprising:

adding a styrenic monomer to the phenol/aryl diolefin polymer to initiate a reaction between the phenol/aryl diolefin polymer and said styrenic monomer and to obtain a phenol aralkylation polymer and, optionally, thereafter adding a second portion of a phenolic monomer to the phenol aralkylation polymer to obtain further aralkylation of the polymer.

14. The process of claim 13 wherein said styrenic monomer is selected from the group consisting of styrene, α-methyl styrene, p-t-butyl styrene, p-ethyl styrene, m-ethyl styrene, p-vinyl toluene, mixed vinyl toluenes, mixed t-butyl styrenes, mixed ethyl styrenes, mixed t-butyl styrenes with di-t-butyl styrenes, and mixtures thereof.

15. The process of claim 14 wherein said styrenic monomer is selected from the group consisting of α-methyl styrene, p-t-butyl styrene, p-vinyl toluene, mixed vinyl toluenes and mixtures thereof.

16. The process of claim 12 wherein the aryl diolefin is selected from the group consisting of m-diisopropenylbenzene, p-diisopropenylbenzene, mixed diisopropenylbenzenes, m-divinylbenzene, p-divinylbenzene, and mixed divinylbenzenes.

17. The process of claim 12 wherein the phenolic monomer is selected from the group consisting of bisphenol A, bisphenol F, hydroquinone, resorcinol and catechol.

18. The process of claim 12 wherein all or a portion of the aryl diolefin is derived by dehydration of benzylic diols.

19. The process of claim 12 wherein said molar ratio of moles of total styrenic reactant to moles of phenolic monomer is from about 0.8 to about 2.

20. The process of claim 19 wherein said molar ratio is from about 1.2 to about 2.

21. The process of claim 12 wherein said catalyst comprises alkyl sulfonic acid and is added in an amount of from about 0.04 to 0.06 mole percent based on the total number of moles of catalyst and phenolic monomer.

22. The process of claim 12 wherein said reaction temperature is from about 130° C. to about 135° C.

23. A process of preparing a phenol aralkylation monomer or polymer composition by reactions involving (a) a phenolic monomer selected from the group consisting of bisphenol A, bisphenol F, hydroquinone, resorcinol and catechol, (b) a styrenic monomer selected from the group consisting of styrene, alpha-methyl styrene, para-tert butyl styrene and mixtures thereof, and optionally (c) divinyl benzene, with minimized formation of (i) non-functional homo-polymerized styrenic components and (ii) mono-fimctional phenol degradation by-products, the process comprising:

preparing a slurry of phenolic monomer in a first portion of at least one styrenic monomer at a molar ratio of moles of total styrenic reactant to moles of phenolic monomer of from 0.5 to about 2.1;

adding an aralkylation catalyst to the slurry to initiate a reaction between the phenolic monomer and the at least one styrenic monomer, said aralkylation catalyst added at from about 0.04 to about 0.06 mole percent based on the total number of moles of catalyst and phenolic monomer;

maintaining the slurry at a temperature of from about 130° C. to about 140° C. for a time sufficient to obtain an aralkylated phenolic monomer; and optionally adding divinyl benzene to the aralkylated phenolic monomer to initiate a reaction between the aralkylated phenolic monomer and the aryl diolefin and obtain a phenol aralkylation polymer and, thereafter, optionally adding a second portion of the at least one styrenic monomer to the phenol aralkylation polymer to obtain further aralkylation of the polymer, wherein said phenol aralkylation monomer or polymer composition so-produced comprises no more than 10% by weight combined of (i) said non-functional homopolymerized styrenic components and (ii) said monofunctional phenol degradation by-products.

24. The process of claim 23 wherein said phenolic monomer comprises bisphenol-A.

25. A product produced by the process of claim 1.

26. A product produced by the process of claim 23.

* * * * *

UNITED STATES PATENT AND TRADEMARK OFFICE
CERTIFICATE OF CORRECTION

PATENT NO. : 6,399,740 B1
DATED : June 4, 2002
INVENTOR(S) : Edward Lucas, Jr. et al.

It is certified that error appears in the above-identified patent and that said Letters Patent is hereby corrected as shown below:

<u>Title page,</u>
Item [57], ABSTRACT,
Line 1, "aralkyistion" has been replaced with -- aralkylation --.

<u>Column 1,</u>
Line 9, "particulrly" has been replaced with -- particularly --,
Line 31, "phenolvaryl diolelin" has been replaced with -- phenol/aryl diolefin --,
Line 59, "actylates" has been replaced with -- acrylates --,
Line 66, "mono-fuctional" has been replaced with -- mono-functional --.

<u>Column 2,</u>
Line 13, "iially is arlkyi" has been replaced with -- initially is aralkylated --,
Line 19, "preliminar" has been replaced with -- preliminary --,
Line 29, "mixure" has been replaced with -- mixture --.

<u>Column 3,</u>
Line 24, "significnt" has been replaced with -- significant --,
Line 28, "often" has been replaced with -- of ten --.

<u>Column 4,</u>
Line 16, "1250" has been replaced with -- 125º --,
Line 34, "linns" has been replaced with -- links --,
Line 42, "conception" has been replaced with -- concentration --,
Line 52, "mixure to reaize" has been replaced with -- mixture to realize --,
Line 63, "tempeure" has been replaced with -- temperature --.

<u>Column 5,</u>
Line 5, "alke" has been replaced with -- alkene --,
Line 66, "systec" has been replaced with -- styrenic --.

<u>Column 6,</u>
Line 2, "r-ethyl styrene" has been replaced with -- m-ethyl styrene --,
Line 49, "dilsopropyl" has been replaced with -- diisopropyl --,
Line 53, "amyl" has been replaced with -- aryl --.

UNITED STATES PATENT AND TRADEMARK OFFICE
CERTIFICATE OF CORRECTION

PATENT NO. : 6,399,740 B1
DATED : June 4, 2002
INVENTOR(S) : Edward Lucas, Jr. et al.

It is certified that error appears in the above-identified patent and that said Letters Patent is hereby corrected as shown below:

Column 7,
Line 15, "arallylation" has been replaced with -- aralkylation --,
Line 55, "havingl" has been replaced with -- having --,
Line 55, "arly" has been replaced with -- aralkyl --,
Line 58, "sytm" has been replaced with -- systems --.

Column 8,
Line 62, "desired," has been replaced with -- desired. --.

Column 9,
Line 1, "flictionality" has been replaced with -- functionality --.

Column 10,
Line 29, "arallat" has been replaced with -- aralkylated --,
Line 30, "pcumyl" has been replaced with -- p-cumyl --,
Line 64, "sulfbonic" has been replaced with -- sulfonic --.

Column 11,
Line 14, "bananc" has been replaced with -- balance --,
Line 30, "aralylation" has been replaced with -- aralkylation --,
Line 48, "500%" has been replaced with -- 50% --.

Column 14,
Line 17, "phenollaryl" has been replaced with -- phenol/aryl --,
Line 62, "mono-fimctional" has been replaced with -- mono-functional --.

Signed and Sealed this

Eighteenth Day of February, 2003

JAMES E. ROGAN
*Director of the United States Patent and Trademark Office*